United States Patent
Swidler et al.

(10) Patent No.: US 7,761,882 B1
(45) Date of Patent: Jul. 20, 2010

(54) EMULATOR AND REAL DEVICE PROXY

(75) Inventors: Shlomo Swidler, Bareqet (IL); Daniel Blaukopf, Ra'anana (IL)

(73) Assignee: Oracle America, Inc., Redwood City, CA (US)

( * ) Notice: Subject to any disclaimer, the term of this patent is extended or adjusted under 35 U.S.C. 154(b) by 1398 days.

(21) Appl. No.: 11/186,205

(22) Filed: Jul. 20, 2005

(51) Int. Cl.
*G06F 3/038* (2006.01)

(52) U.S. Cl. .................................. 719/321; 717/138

(58) Field of Classification Search .................. 719/321
See application file for complete search history.

(56) References Cited

U.S. PATENT DOCUMENTS

2002/0130834 A1 * 9/2002 Madarasz et al. ........... 345/156
2005/0015702 A1 * 1/2005 Shier et al. .................. 714/776

* cited by examiner

*Primary Examiner*—Hyung S Sough
*Assistant Examiner*—Syed Roni
(74) *Attorney, Agent, or Firm*—Martine Penilla & Gencarella, LLP

(57) ABSTRACT

A system and method are disclosed for emulating electronic device functionality. An emulator is defined to operate on a computing platform to simulate functionality of an electronic device. The electronic device and computing platform are separate from each other. A proxy client module is defined to operate in conjunction with the emulator. The proxy client module is defined to transmit an application request from the emulator to the electronic device to be processed by the electronic device. A proxy server module is defined to operate on the electronic device. The proxy server module is defined to receive the application request transmitted from the proxy client module, submit the application request to the electronic device for processing, and transmit results of the application request processing to the proxy client module.

12 Claims, 4 Drawing Sheets

| Emulator Configuration |||
|---|---|---|
| Function | Emulator | Device |
| API(1) | ✓ | ☐ |
| API(2) | ☐ | ✓ |
| API(3) | ☐ | ✓ |
| API(4) | ✓ | ☐ |
| API(5) | ✓ | ☐ |
| API(6) | ☐ | ✓ |

Fig. 3

EMULATOR AND REAL DEVICE PROXY

BACKGROUND

Software developers writing applications for non-personal computer (PC) devices, e.g., a handheld electronic device, often prefer to use a PC platform to perform the application development. Use of the PC platform provides the developers with access to software development resources that would not be available on the non-PC device. A common approach for using the PC platform to develop software applications for the non-PC device is to provide a software-based emulator that operates on the PC platform to simulate the hardware and software behavior of the non-PC device. Traditionally, the software-based emulator is defined to simulate a specific non-PC device. Thus, a separate emulator is needed for different models or versions of the non-PC device. Using the emulator, the software developer can investigate how a particular application under development will function on the non-PC device. However, limitations exist with respect to how well the conventional software-based emulator can simulate the behavior of the actual non-PC device. Therefore, a guarantee cannot be provided that the application operating environment on the actual non-PC device will be equivalent to the simulated application operating environment provided by the conventional emulator on the PC.

One limitation associated with the conventional emulator is that the actual non-PC device's operating system may not match the PC's operating system. In this case, the non-PC device's operating system software must be ported to the PC's operating system. Such porting of one operating system to another can be difficult, time consuming, and error-prone. Another limitation of the conventional emulator stems from the fact that the conventional emulator attempts to simulate the hardware and software functionality of the non-PC device as well as the interfacing network functionality associated with the non-PC device. However, limitations exist with respect to how accurately the conventional software-based emulator can simulate the non-PC device hardware functionality and, more particularly, the interfacing network functionality that is not completely within the design envelope of the non-PC device. In some instances it may be impossible to provide within the software-based emulator the same functionality that is available on the non-PC device. For example, if the non-PC device is a cellular phone, the non-PC device can provide access to an actual cellular network, but the conventional software-based emulator operating on the PC cannot provide access to the actual cellular network.

Additionally, features within the application that are either not simulated or poorly simulated by the conventional emulator will need to be debugged following deployment of the application on the non-PC device. In general, applications are often difficult to debug once deployed on the actual non-PC device. Furthermore, the application deployment process on the non-PC device can be tedious and expensive. Thus, it is inefficient for the application developer to frequently deploy the application on the non-PC device for testing at various iterations of the application development cycle. Nevertheless, the application developer often needs to utilize certain features that cannot be accurately simulated by the conventional software-based emulator on the PC. Thus, an uncomfortable balance must be maintained between application debugging difficulty level and the expense of more frequent application deployments to the non-PC device during the application development process using the conventional software-based emulator.

SUMMARY

It should be appreciated that the present invention can be implemented in numerous ways, such as a process, an apparatus, a system, a device or a method. Several inventive embodiments of the present invention are described below.

In one embodiment, a system is disclosed for emulating electronic device functionality. The system includes an emulator defined to operate on a computing platform to simulate functionality of an electronic device. The electronic device and computing platform are separate from each other. The system also includes a proxy client module defined to operate in conjunction with the emulator. The proxy client module is defined to transmit an application request from the emulator to the electronic device to be processed by the electronic device. The system further includes a proxy server module defined to operate on the electronic device. The proxy server module is defined to receive the application request transmitted from the proxy client module, submit the application request to the electronic device for processing, and transmit results of the application request processing to the proxy client module.

In another embodiment, a method for emulating electronic device functionality is disclosed. The method includes examining an application request to determine whether the application request is to be processed by an emulation of an electronic device or by the actual electronic device. If the application request is to be processed by the actual electronic device, the method includes transmitting the application request to the electronic device from a computing platform upon which the emulation of the electronic device is being performed. The application request is then processed on the electronic device. The method then proceeds with transmitting a result of the application request processing from the electronic device to the computing platform. At the computing platform, the result of the application request processing is provided to a requesting application being executed on the emulation of the electronic device.

In another embodiment, a computer readable media including program instructions for emulating electronic device functionality is disclosed. Program instructions are provided for examining an application request to determine whether the application request is to be processed by an emulation of an electronic device or by the actual electronic device. Program instructions are also provided for transmitting the application request to the electronic device from a computing platform upon which the emulation of the electronic device is being performed, when the application request is to be processed by the actual electronic device. Further program instructions are provided for receiving the application request at the electronic device and submitting the application request to be processed by the electronic device. Program instructions are provided for transmitting a result of the application request processing from the electronic device to the computing platform. Additional program instructions are provided for receiving the result of the application request processing at the computing platform and providing the result of the application request processing to a requesting application being executed on the emulation of the electronic device.

Other aspects of the invention will become apparent from the following detailed description, taken in conjunction with the accompanying drawings, illustrating by way of example the principles of the invention.

BRIEF DESCRIPTION OF THE DRAWINGS

FIG. 3 is an illustration showing an example graphical user interface that can be provided for manual configuration of the emulator, in accordance with one embodiment of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
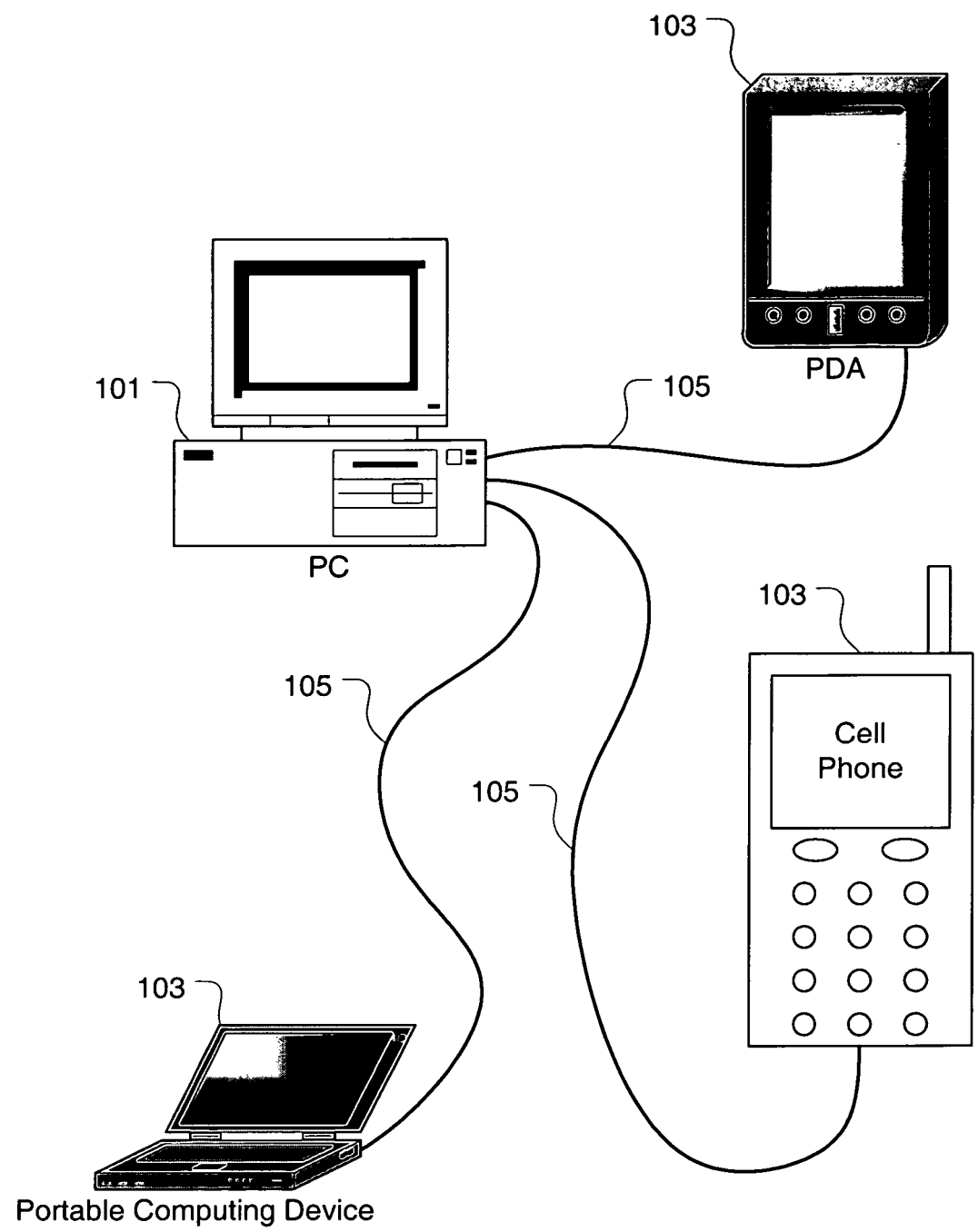
FIG. 1 is an illustration showing a physical configuration of an emulation system, in accordance with one embodiment of the present invention.

FIG. 1 is an illustration showing a physical configuration of an emulation system, in accordance with one embodiment of the present invention. The emulation system enables development of an application for an electronic device 103 on a separate computing platform 101, such as a personal computer (PC). It should be appreciated that the electronic device 103 can represent essentially any electronic device that may not provide resources for efficient application development. For example, the electronic device 103 can be a portable computing device, a personal digital assistant (PDA), or a cellular phone, as well as many other electronic devices having limited computing ability. Also, the computing platform 101 is connected to the electronic device 103 by a communication link 105. The communication link 105 can be defined by essentially any fabric that is capable of enabling electronic communication between the computing platform 101 and the electronic device 103. For example, in various embodiments the communication link 105 can be defined as an ethernet connection, a serial connection, a combination of ethernet and serial connections, a network connection, or a fiberoptic connection, among others. Also, in one embodiment, the communication link 105 can be implemented as a wireless connection. It should be appreciated, however, that the present invention is not limited by a particular embodiment of the communication link 105.

The emulation system includes a proxy client module operating on the computing platform 101, a proxy server module operating on the electronic device 103, and a network protocol to enable communication between the proxy client module and the proxy server module over the communication link 105. The proxy client module is defined as part of an emulator operating on the computing platform 101. The emulator is defined to simulate functionality of the electronic device 103 with respect to hardware, software, and any network interfaces. However, unlike conventional emulators, the emulation system of the present invention is defined to delegate electronic device 103 functionality that cannot be accurately simulated on the emulator to the actual electronic device 103 for performance. Electronic device 103 functionality that can be accurately simulated by the emulator operating on the computing platform 101 is performed by the emulator without recourse to the electronic device 103.

The proxy client module is defined to operate in conjunction with the emulator on the computing platform 101. The proxy client module is defined to transmit an application request from the emulator to the proxy server module on the electronic device 103 to be processed by the electronic device 103. It should be understood that the application request is initiated by an application executing on the emulator on the computing platform 101. Thus, the proxy client module functions to forward application requests for particular electronic device 103 functionality to the actual electronic device for processing and report the associated results of the processing from the electronic device 103 to the requesting application.

The proxy server module is defined to operate on the electronic device 103 to receive the application request transmitted from the proxy client module and submit the application request to the electronic device 103 for processing. The proxy server module is also defined to transmit results of the application request processing as generated by the electronic device 103 to the proxy client module operating in conjunction with the emulator on the computing platform 101. Thus, the proxy server software listens for application requests from the proxy client module, submits received application requests to the electronic device for execution on behalf of the emulator, and reports results of the application request processing from the electronic device to the proxy client module for use by the emulator.

The emulation system of the present invention enables an application to be executed using a combination of the emulator operating on the computing platform 101 and the actual electronic device 103 during the application development process. Thus, features of the application that use aspects of the electronic device's functionality that cannot be accurately simulated can be delegated by the emulator for execution on the actual electronic device. Then, results from the application feature executed on the electronic device can be returned to the emulator to be passed up to the application. Thus, from the application perspective, it appears as though the emulator is handling all of the requested functionality even though some of the requested functionality is actually being performed by the real electronic device. It should be appreciated that the functionality forwarded from the emulator to the actual electronic device will generally be associated with more difficult aspects of the electronic device emulation and/or areas of the electronic device functionality that are known to be particularly complex or troublesome.

Figure 2:
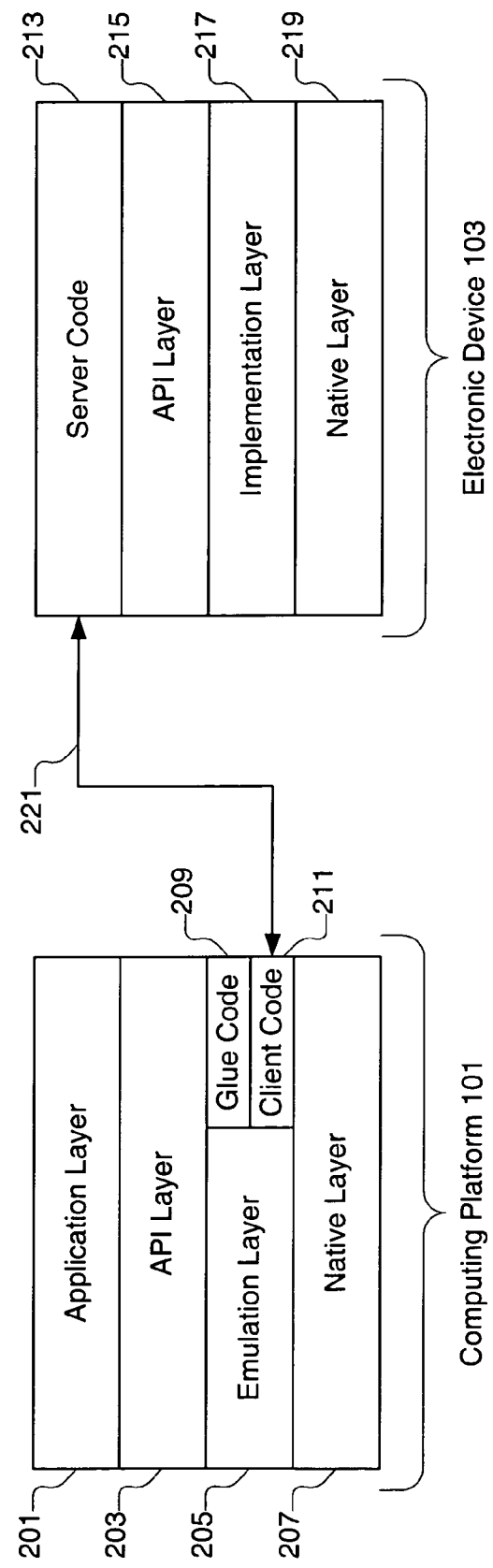
FIG. 2 is an illustration showing a software configuration of the emulation system as deployed on the computing platform and the electronic device, in accordance with one embodiment of the present invention.

FIG. 2 is an illustration showing a software configuration of the emulation system as deployed on the computing platform 101 and the electronic device 103, in accordance with one embodiment of the present invention. With respect to the computing platform 101, the software configuration includes an application layer 201. The application layer 201 represents the application under development that is to be executed on the emulator operating on the computing platform 101. The application layer 201 interfaces with an API layer 203. The API layer 203 includes a number of application programming interfaces (APIs) that the application references to enable its functionality. It should be appreciated by those skilled in the art that APIs represent program components that provide specific functional outputs based on a well-defined set of arguments. Additionally, it should be appreciated that the same APIs present on the actual electronic device are also present in the API layer 203.

The APIs referenced by the application being developed are processed by an emulation layer 205. The emulation layer 205 includes program instructions for simulating the functionality of the electronic device. Thus, the emulation layer 205 represents the software implementation of the emulator as previously discussed. Execution of the program instructions of the emulation layer 205 is enabled through an interface with a native layer 207 of the computing platform 101. The native layer 207 of the computing platform 101 represents the operating system and hardware features that are specific to the computing platform 101.

The application under development will generally reference a number of APIs present in the API layer 203 to provide the operational features of the application. The referenced APIs represent application requests to be processed by the emulator. Thus, each application request, i.e., API, will exercise some functionality of the electronic device. Application requests associated with electronic device functionality that can be efficiently and accurately emulated will be processed locally within the emulation layer 205. However, other application requests that utilize electronic device functionality that cannot be efficiently and accurately emulated will be forwarded to the actual electronic device for processing.

The emulation layer 205 includes the proxy client module as previously discussed to enable forwarding of non-emulatable application requests to the electronic device for processing. In one embodiment, the proxy client module can be represented by a translation module and a communication module. In the context of the software configuration of FIG. 2, the translation module is represented by glue code 209, and the communication module is represented by client code 211. The glue code 209 serves to provide two-way translation between the API code and the client code 211. Also, the glue code 209 is defined to provide translation for only those APIs that are to be forwarded to the electronic device for processing. Thus, the glue code 209 can be used to identify which APIs are to be forwarded to the electronic device for processing. More specifically, if glue code 209 exists for a particular API, each application request associated with the particular API will be forwarded to the electronic device for processing. However, if glue code 209 does not exist for a certain API, each application request associated with the certain API will be emulated locally through the emulation layer 205 without being forwarded to the electronic device for processing.

The client code is defined to prepare and transmit a message from the emulator to the proxy server module operating on the electronic device 103. The message prepared and transmitted by the client code includes the application request, i.e., API reference, to be processed by the electronic device. The client code is further defined to receive a results message back from the proxy server module on the electronic device. The results message includes results of the application request processing as performed on the electronic device. Upon receipt of the results message, the client code is defined to transfer the results of the application request processing to the glue code. The glue code in turn transfers the results of the application request processing to the application executing on the emulator from which the application request was initiated. The glue code translates the results as received by the client code into a format that is expected by the application.

With respect to FIG. 2, the client code 211 communicates with server code 213 residing on the electronic device 103, as indicated by arrow 221. The server code 213 represents the program instructions that define the proxy server module as discussed above. On the electronic device 103, the server code 213 interfaces with an API layer 215. The API layer 215 includes each API that is present within the API layer 203 on the computing platform 101. Thus, API components available on the electronic device are also available the computing platform, vice-versa. The API layer 215 interfaces with an implementation layer 217. The implementation layer 217 is defined to use resources present within a native layer 219 of the electronic device to provide features and functionality described by the APIs in the API layer 215.

The server code 213 operating on the electronic device 103 is defined to accept application requests from the client code 211 of the emulator, submit the application requests to the electronic device for processing, and return the results of the application request processing to the emulator via the client code 211. In one embodiment, the server code 213 is defined to continually listen for application requests communicated from the client code 211. In another embodiment, the server code 213 is defined to poll the emulator on occasion to inquire as to whether any application requests are to be processed by the electronic device. In one embodiment, the server code 213 is written using Java, e.g., J2ME, to be platform generic to enable execution of the server code 213 on any electronic device that supports Java, regardless of electronic device manufacturer or model. In another embodiment, however, the server code 213 is written in non-generic manner to operate on the specific electronic device.

As previously mentioned, communication between the client code 211 and the server code 213 is performed using a network protocol. The network protocol represents a communication format that is understood by both the client code 211 and the server code 213. In one embodiment, the present invention can be implemented using a common network protocol, such as TCP/IP or HTTP. In another embodiment, the present invention can be implemented using a network protocol that includes a message format developed to expedite application request and results transmission between the client code 211 and the server code 213.

The emulator of the present invention is defined to know how to process each API in the application layer 203. For a given API, the emulator is capable of determining whether the API should be processed locally on the computing platform 101 or forwarded to the actual electronic device, via the glue code 209 and client code 211, for processing. In one embodiment, the emulator can be configured manually, e.g., by the application developer, to specify which APIs are to be processed by the emulator and which are to be processed by the actual electronic device. Such manual configuration of the emulator can be enabled through an interface. FIG. 3 is an illustration showing an example graphical user interface (GUI) that can be provided for manual configuration of the emulator, in accordance with one embodiment of the present invention. In another embodiment, the emulator can be defined to use one of a number of pre-defined API delegation schemes. It should be appreciated, however, that regardless of the specific embodiment used for configuring the emulator, each API that is to be delegated to the actual electronic device for processing should have associated glue code 209 present within the emulator.

To illustrate how the emulation system of the present invention can be implemented in accordance with an exemplary embodiment, code excerpts for an example application, glue code, client code, and server code are presented in Tables 1-4, respectively. It should be appreciated, that the code excerpts of Tables 1-4 are presented for description purposes only. The present invention is not limited in any way to the code excerpts presented in Tables 1-4.

Table 1 shows an example application that references an API called "RecordStore." For purposes of the present example, the emulator that the application is executing on is configured to delegate processing of any application request associated with the "RecordStore" API to the actual electronic device.

Table 2 shows an example of the glue code associated with the "RecordStore" API. When the "RecordStore" API is referenced in an application request, the glue code serves to translate the "RecordStore" API reference into a format that is understandable by the client code. More specifically, in the present example the glue code mirrors the structure of the Java class "RecordStore." However, each method of "RecordStore" as provided in the glue code is defined to forward the corresponding method call the client code.

Table 3 shows an example of the client code associated with the "RecordStore" API. As will be appreciated by those skilled in the art, the client code functions to open a connection to the server code, build up a message to be sent to the server code, and transmit the message to the server code. The message built by the client code includes the application request to the "RecordStore" API as communicated from the glue code, including any arguments of the specific function referenced in the "RecordStore" API.

Table 4 shows an example of the server code defined to accept application requests associated with the "RecordStore" API as transmitted from the client code. As will be appreciated by those skilled in the art, the server code functions to open and sit on a network connection to the client code. The server code also functions to receive and process messages from the client code. When the message is received from the client code, the server code functions to identify the application request command and associated arguments within the message. Then, the server code functions to call an appropriate method to have the application request command processed by the electronic device.

Once the application request is processed by the electronic device, the results of the application request processing are communicated back from the server code to the client code. From the client code the results are communicated to the glue code and on to the requesting application. For ease of discussion, the program instructions for communicating the results of the application request processing from the electronic device to the application executing on the emulator are not shown in the glue code, client code, and server code of Tables 2-4. However, given the description of the present invention herein, one skilled in the art will recognize how the results of the application request processing can be communicated from the electronic device back to the application.

TABLE 1

Example Application

```
// Application.java
// This file contains the example application.
public class Application
{
    public static void main(String[ ] args)
    {
        try {
            RecordStore store = RecordStore.openRecordStore("high-Scores", true);
            String newDataStr = "john doe: 1800";
            byte[ ] newDataBytes = newDataStr.getBytes( );
            store.addRecord(newDataBytes, 0, newDataBytes.length);
            store.closeRecordStore( );
        } catch (Throwable t) {
            System.out.println("Application caught: ");
```

TABLE 1-continued

Example Application

```
            t.printStackTrace( );
        }
    }
}
```

TABLE 2

Example Glue Code

```
// RecordStore.java
// This file contains the example glue code.
public class RecordStore {
    private static ProxyClient proxy = null;
    static {
        try {
            proxy = new ProxyClient( );
        } catch (Exception e) {
            System.out.println("RecordStore: unable to create ProxyClient!");
            e.printStackTrace( );
        }
    }
    private String name;
    private RecordStore(String name) {
        this.name = name;
    }
    public static RecordStore openRecordStore(String storageName, boolean create)
        throws Exception
    {
        proxy.openRMS(storageName, create);
        return new RecordStore(storageName);
    }
    public void addRecord(byte[ ] data, int offset, int numBytes) throws Exception
    {
        byte[ ] recData = new byte[numBytes];
        if (numBytes>0)
        {
            System.arraycopy(data, offset, recData, 0, numBytes);
        }
        proxy.addRMSRecord(name, recData);
    }
    public void closeRecordStore( ) throws Exception
    {
        proxy.closeRMS(name);
    }
}
```

TABLE 3

Example Client Code

```
// ProxyClient.java
// This file contains the example client code.
import java.io.*;
import java.net.*;
public class ProxyClient
{
    private static final String SERVER_HOST = "localhost";
    private static final int SERVER_PORT = 9987;
    private Socket clientSocket = null;
    private DataOutputStream dos = null;
    public ProxyClient( ) throws Exception
    {
        clientSocket = new Socket(SERVER_HOST, SERVER_PORT);
        dos = new DataOutputStream(clientSocket.getOutputStream( ));
    }
    public void openRMS(String name, boolean create) throws Exception
    {
```

TABLE 3-continued

Example Client Code

```
        ByteArrayOutputStream baos = new ByteArrayOutputStream( );
        DataOutputStream dos = new DataOutputStream(baos);
        dos.writetUTF(name);
        dos.writeBoolean(create);
        dos.flush( );
        sendToServer("rmsOpen", baos.toByteArray( ));
    }
    public void addRMSRecord(String name, byte[ ] recData) throws
Exception
    {
        ByteArrayOutputStream baos = new ByteArrayOutputStream( );
        DataOutputStream dos = new DataOutputStream(baos);
        dos.writeUTF(name);
        dos.writeInt(recData.length);
        dos.write(recData, 0, recData.length);
        dos.flush( );
        sendToServer("rmsAddRec", baos.toByteArray( ));
    }
    public void closeRMS(String name) throws Exception
    {
        ByteArrayOutputStream baos =
        new ByteArrayOutputStream( );
        DataOutputStream dos = new DataOutputStream(baos);
        dos.writeUTF(name);
        dos.flush( );
        sendToServer("rmsClose", baos.toByteArray( ));
    }
    private void sendToServer(String command, byte[ ] data) throws
Exception
    {
        dos.writeUTF(command);
        dos.write(data, 0, data.length);
        dos.flush( );
    }
}
```

TABLE 4

Example Server Code

```
// ExampleServerCode.java
import java.util.*;
import java.io.*;
import javax.microedition.midlet.*;
import javax.microedition.rms.*;
import javax.microedition.io.*;
public class ProxyServerMIDlet extends MIDlet
{
    private static final int SERVER_PORT = 9987;
    private Hashtable proxyObjs = new Hashtable( );
    private ServerSocketConnection serverSocketConnection = null;
    private SocketConnection serverSocket = null;
    private DataInputStream dis = null;
    public ProxyServerMIDlet( )
    {
    }
    public void startApp( )
    {
        try {
            if (dis == null) {
                serverSocketConnection =
(ServerSocketConnection)Connector.open(
                    "socket://:" + SERVER_PORT);
                serverSocket =
(SocketConnection)serverSocketConnection.acceptAndOpen( );
                dis = serverSocket.openDataInputStream( );
            }
            while (true) {
                String command = dis.readUTF( );
                dispatch(command);
            }
        } catch (Throwable t) {
            System.out.println("ProxyServerMIDlet caught:");
            t.printStackTrace( );
```

TABLE 4-continued

Example Server Code

```
        }
        System.out.println("ProxyServerMIDlet exiting.");
        notifyDestroyed( );
    }
    public void pauseApp( )
    {
    }
    public void destroyApp( boolean unconditional )
    {
    }
    private void dispatch(String command) throws Exception
    {
        if (command.equals("rmsOpen")) {
            String name = dis.readUTF( );
            openRecStore(name, dis.readBoolean( ));
        } else if (command.equals("rmsAddRec")) {
            String name = dis.readUTF( );
            int len = dis.readInt( );
            byte[ ] recData = new byte[len];
            if (len > 0) {
                dis.readFully(recData);
            }
            addRecord(name, recData);
        } else if (command.equals("rmsClose")) {
            closeRecStore(dis.readUTF( ));
        } else {
            System.out.println("Unknown command: " + command);
        }
    }
    private Object openRecStore(String name, boolean bool) throws
RecordStoreException
    {
        RecordStore store = RecordStore.openRecordStore(name, bool);
        proxyObjs.put(name, store);
        return store;
    }
    private int addRecord(String name, byte[ ] rec) throws
RecordStoreException
    {
        RecordStore store = (RecordStore)proxyObjs.get(name);
        return store.addRecord(rec, 0, rec.length);
    }
    private void closeRecStore(String name) throws
RecordStoreException
    {
        RecordStore store = (RecordStore)proxyObjs.get(name);
        store.closeRecordStore( );
    }
}
```

Figure 4:
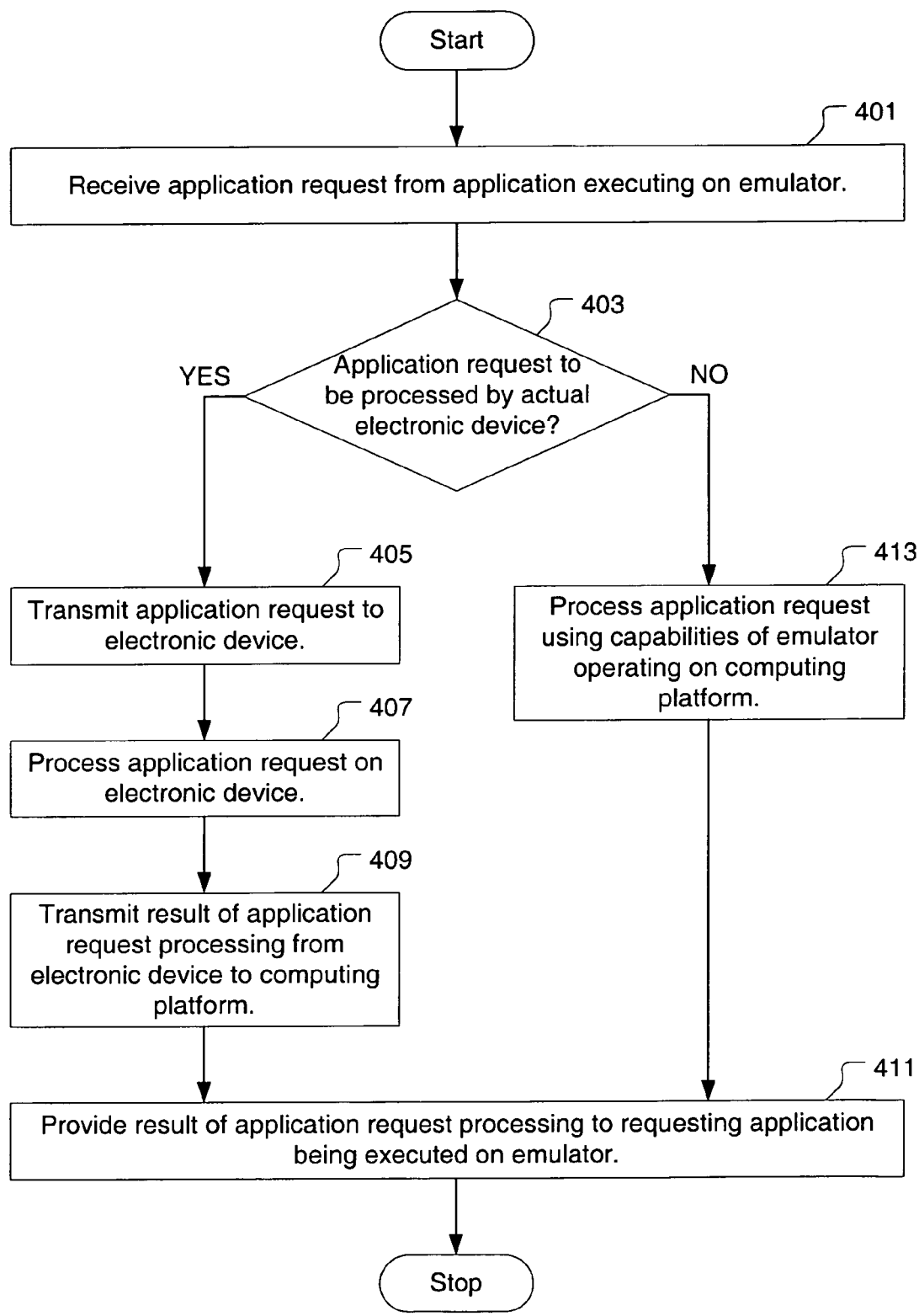
FIG. 4 is an illustration showing a flowchart of a method for emulating electronic device functionality, in accordance with one embodiment of the present invention.

FIG. 4 is an illustration showing a flowchart of a method for emulating electronic device functionality, in accordance with one embodiment of the present invention. The method includes an operation 401 for receiving an application request from an application executing on an emulator that is operating on a computing platform separate from the electronic device that is being emulated by the emulator. In one embodiment, the application request references an API that is operable either within the emulation of the electronic device or within the actual electronic device. The method then proceeds with an operation 403 to examine the application request to determine whether the application request is to be processed by the emulator on the computing platform or by the actual electronic device. In one embodiment, the emulator can be configured to specify which application requests are to be processed by the emulator on the computing platform and which application requests are to be processed by the actual electronic device.

If the application request is to be processed by the actual electronic device, the method proceeds with an operation 405 to transmit the application request to the electronic device from the computing platform upon which the emulation of the electronic device is operating. Then, in an operation 407, the application request is processed on the electronic device. A result of the application request processing is then transmitted in an operation 409 from the electronic device to the computing platform. Once the result of the application request processing is received by the emulator operating on the computing platform, the emulator performs an operation 411 to provide the result of the application request processing to the requesting application that is being executed on the emulator. It should be appreciated that operations 403-409 are hidden from the requesting application.

With reference to the operation 403, if the application request is to be processed by the emulator locally on the computing platform, the method proceeds from the operation 403 to an operation 413 to process the application request using the capabilities of the emulator operating on the computing platform. Then, the method proceeds to the operation 411 to provide the result of the application request processing to the requesting application that is being executed on the emulator.

Using the emulation system provided by the present invention, an application developer will be able to accurately duplicate the behavior of the actual electronic device for which an application is being developed. Thus, the application can be accurately executed using the emulation system without having to deploy the application on the electronic device. Also, the emulation system of the present invention provides for accurate emulation of the actual electronic device's features without having to implement the more complex functionality of the electronic device in the emulator. More specifically, the emulator is defined to include the proxy client module rather than extensive code intended to simulate the complex functionality of the electronic device. Therefore, the present invention provides a significant reduction in the amount and scope of electronic device features that are required to be simulated by the emulator software.

The emulator system of the present invention also reduces the need to provide different emulator implementations for different models of an electronic device. Differences in functionality between the different models can be handled using the proxy client module-to-proxy server module communication provided by the emulation system. Thus, the application developer can use the emulator of the present invention with essentially any real electronic device that is capable of executing the proxy server module. Any functionality of the real electronic device executing the proxy server module can be made available to the application executing on the emulator, via the client proxy module. With respect to the application and application developer, the delegation of API functionality from the emulator to the real electronic device is hidden.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for emulating electronic device functionality, comprising:

an emulator defined to operate on a computing platform to simulate functionality of an electronic device with respect to hardware, software, and any network interfaces of the electronic device such that an application defined to be executed by the electronic device is executable by the emulator on the computing platform, wherein the electronic device is separate from the computing platform;

a first computer readable storage medium defined to operate in conjunction with the computing platform, the first computer readable medium having executable program instructions stored thereon for a proxy client module, the proxy client module defined to operate in conjunction with the emulator, the proxy client module defined to transmit an application request from the emulator to the electronic device to be processed by the electronic device; and a second computer readable storage medium defined to operate in conjunction with the electronic device, the second computer readable medium having executable program instructions stored thereon for a proxy server module, the proxy server module defined to operate on the electronic device, the proxy server module defined to receive the application request transmitted from the proxy client module, submit the application request to the electronic device for processing, and transmit results of the application request processing to the proxy client module, wherein the proxy client module includes a translation module and a communication module to enable both transmission of the application request from the emulator to the proxy server module on the electronic device and receipt of the results of the application request processing from the proxy server module, wherein the translation module is defined to identify the application request to be transmitted from the emulator to the electronic device to be processed by the electronic device, the translation module further defined to translate between the application request and the communication module.

2. A system for emulating electronic device functionality as recited in claim 1, further comprising:

an interface for configuring the emulator to specify which application requests are to be transmitted by the proxy client module from the emulator to the electronic device to be processed by the electronic device.

3. A system for emulating electronic device functionality as recited in claim 1, wherein the communication module is defined to prepare and transmit a message from the emulator to the proxy server module, the message including the application request to be processed by the electronic device, the communication module further defined to receive a results message from the proxy server module, the results message including results of the application request processing performed on the electronic device.

4. A system for emulating electronic device functionality as recited in claim 3, wherein the communication module is defined to transfer the results of the application request processing to the translation module, the translation module defined to transfer the results of the application request processing to an application executing on the emulator from which the application request was initiated.

5. A system for emulating electronic device functionality as recited in claim 1, further comprising:

a network protocol defined to enable communication between the proxy client module on the computing platform and the proxy server module on the electronic device.

6. A method for emulating electronic device functionality, comprising:

examining an application request to determine whether the application request is to be processed by an emulation of an electronic device or by the electronic device, wherein the emulation of the electronic device simulates functionality of the electronic device with respect to hardware, software, and any network interfaces of the electronic device such that any application defined to be executed by the electronic device is executable by the emulation of the electronic device, wherein the application request references an Application Programming Interface (API) that is operable either within the emulation of the electronic device or within the electronic device;

if the application request is to be processed by the electronic device, transmitting the application request to the electronic device from a computing platform upon which the emulation of the electronic device is being performed, processing the application request on the electronic device, transmitting a result of the application request processing from the electronic device to the computing platform, and providing the result of the application request processing to a requesting application being executed on the emulation of the electronic device; and if the application request is to be processed by the emulation of the electronic device, processing the application request using the emulation of the electronic device, and providing the result of the application request processing to a requesting application being executed on the emulation of the electronic device.

7. A method for emulating electronic device functionality as recited in claim 6, further comprising:

configuring the emulation of the electronic device to specify which application requests are to be processed by the emulation of the electronic device and which application requests are to be processed by the actual electronic device.

8. A method for emulating electronic device functionality as recited in claim 6, wherein transmitting the application request to the electronic device from the computing platform and transmitting the result of the application request processing from the electronic device to the computing platform are performed in accordance with a network protocol.

9. A method for emulating electronic device functionality as recited in claim 6, wherein the operations of examining the application request, transmitting the application request to the electronic device from the computing platform, processing the application request on the electronic device, and transmitting the result of the application request processing from the electronic device to the computing platform are hidden from the requesting application being executed on the emulation of the electronic device.

10. A computer readable storage media including program instructions for emulating electronic device functionality, comprising:

program instructions for examining an application request to determine whether the application request is to be processed by an emulation of an electronic device or by the electronic device, wherein the emulation of the electronic device simulates functionality of the electronic device with respect to hardware, software, and any network interfaces of the electronic device such that any application defined to be executed by the electronic device is executable by the emulation of the electronic device, wherein the application request references an Application Programming Interface (API) that is operable either within the emulation of the electronic device or within the electronic device;

program instructions for transmitting the application request to the electronic device from a computing platform upon which the emulation of the electronic device is being performed when the application request is to be processed by the electronic device;

program instructions for receiving the application request at the electronic device and submitting the application request to be processed by the electronic device;

program instructions for transmitting a result of the application request processing from the electronic device to the computing platform;

program instructions for receiving the result of the application request processing at the computing platform and providing the result of the application request processing to a requesting application being executed on the emulation of the electronic device; and program instructions for processing the application request using the emulation of the electronic device when the application request is to be processed by the emulation of the electronic device, and program instructions for providing the result of the application request processing to a requesting application being executed on the emulation of the electronic device.

11. A computer readable storage media including program instructions for emulating electronic device functionality as recited in claim 10, further comprising:

program instructions for configuring the emulation of the electronic device to specify which application requests are to be processed by the emulation of the electronic device and which application requests are to be processed by the electronic device.

12. A computer readable storage media including program instructions for emulating electronic device functionality as recited in claim 10, wherein the program instructions for transmitting the application request to the electronic device from the computing platform and transmitting the result of the application request processing from the electronic device to the computing platform include program instructions for performing the transmitting operations in accordance with a network protocol.

* * * * *